US 12,387,340 B2

(12) United States Patent
Yu et al.

(10) Patent No.: US 12,387,340 B2
(45) Date of Patent: Aug. 12, 2025

(54) SYSTEMS AND METHODS FOR OPEN VOCABULARY INSTANCE SEGMENTATION IN UNANNOTATED IMAGES

(71) Applicant: Salesforce, Inc., San Francisco, CA (US)

(72) Inventors: Ning Yu, Palo Alto, CA (US); Vibashan Vishnukumar Sharmini, Palo Alto, CA (US); Chen Xing, Palo Alto, CA (US); Juan Carlos Niebles Duque, Mountain View, CA (US); Ran Xu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 435 days.

(21) Appl. No.: 18/159,318

(22) Filed: Jan. 25, 2023

(65) Prior Publication Data

US 2024/0070868 A1 Feb. 29, 2024

Related U.S. Application Data

(60) Provisional application No. 63/401,521, filed on Aug. 26, 2022.

(51) Int. Cl.
 *G06T 7/11* (2017.01)
 *G06V 10/26* (2022.01)

(52) U.S. Cl.
 CPC .............. *G06T 7/11* (2017.01); *G06V 10/273* (2022.01)

(58) Field of Classification Search
 CPC ........ G06T 7/11; G06V 10/273; G06V 10/25; G06V 10/82
 See application file for complete search history.

(56) References Cited

U.S. PATENT DOCUMENTS

| | | | | |
|---|---|---|---|---|
| 10,402,978 | B1* | 9/2019 | Kim | G06T 7/11 |
| 11,410,388 | B1* | 8/2022 | Taghavi | G06V 10/7747 |
| 11,928,854 | B2* | 3/2024 | Minderer | G06V 10/776 |
| 2018/0143966 | A1* | 5/2018 | Lu | G06V 30/19173 |
| 2020/0117951 | A1* | 4/2020 | Li | G06F 18/217 |
| 2021/0241034 | A1* | 8/2021 | Laradji | G06N 3/08 |
| 2022/0122260 | A1* | 4/2022 | Yang | G06V 10/25 |
| 2022/0268939 | A1* | 8/2022 | Najmark | G06V 10/774 |
| 2023/0154213 | A1* | 5/2023 | Gao | G06V 10/25 382/159 |
| 2023/0252774 | A1* | 8/2023 | Kuen | G06T 7/70 382/157 |
| 2023/0281826 | A1* | 9/2023 | Schulter | G06V 10/761 382/173 |

(Continued)

FOREIGN PATENT DOCUMENTS

| | | | |
|---|---|---|---|
| CN | 111931727 A | * 11/2020 | ........... G06K 9/0063 |
| CN | 118823456 A | * 10/2024 | |

OTHER PUBLICATIONS

Lu, W. "Boundarymix: Generating pseudo-training images for improving segmentation with scribble annotations" Pattern Recognition 117 (2021), pp. 1-11 (Year: 2021).*

(Continued)

*Primary Examiner* — Mia M Thomas
(74) *Attorney, Agent, or Firm* — Haynes and Boone, LLP

(57) ABSTRACT

Embodiments described herein provide an open-vocabulary instance segmentation framework that adopts a pre-trained vision-language model to develop a pipeline in detecting novel categories of instances.

20 Claims, 13 Drawing Sheets

(56) References Cited

U.S. PATENT DOCUMENTS

| | | | |
|---|---|---|---|
| 2023/0281977 A1* | 9/2023 | Schulter | G06V 20/52 |
| | | | 348/180 |
| 2024/0010225 A1* | 1/2024 | Huang | B60W 60/001 |
| 2024/0203085 A1* | 6/2024 | Bangalath | G06T 1/0021 |
| 2024/0378454 A1* | 11/2024 | Schulter | G06N 3/08 |
| 2025/0095826 A1* | 3/2025 | Melapudi | G16H 30/40 |
| 2025/0148757 A1* | 5/2025 | Su | G06V 10/761 |

OTHER PUBLICATIONS

Y. Shen et al., "Parallel Detection-and-Segmentation Learning for Weakly Supervised Instance Segmentation," 2021 IEEE/CVF International Conference on Computer Vision (ICCV), Montreal, QC, Canada, 2021, pp. 8178-8188, doi: 10.1109/ICCV48922.2021.00809. (Year: 2021).*

* cited by examiner

Table 1. Object Detection (mAP) performances for MS-COCO under constrained and generalized setting. $C_B$ and $C_N$ are subset of $C_Q$, where $C_Q$ contains training vocabulary larger than COCO categories.

| Method | VLM | Caption Pre-training | Proposal Generator | Language Supervision | Base Annotation | Constrained Novel | Generalized Novel |
|---|---|---|---|---|---|---|---|
| WSDDN | ✗ | ✗ | - | Image-labels in $C_B \cup C_N$ | ✗ | - | 19.7 |
| Cap2Det | ✗ | ✗ | - | Image-labels in $C_B \cup C_N$ | ✗ | - | 20.3 |
| SB | ✗ | ✗ | RPN $COCO_{base}$ | - | ✓ | 0.70 | 0.31 |
| DELO | ✗ | ✗ | RPN $COCO_{base}$ | - | ✓ | 7.60 | 3.41 |
| PL | ✗ | ✗ | RPN $COCO_{base}$ | - | ✓ | 10.0 | 4.12 |
| OV-RCNN | ✗ | ✓ | RPN $COCO_{base}$ | Image-caption in $C_B \cup C_N$ | ✓ | 27.5 | 22.8 |
| CLIP-RPN | ✓ | ✗ | RPN $COCO_{base}$ | CLIP image-text pair $C_Q$ | ✓ | - | 26.3 |
| ViLD | ✓ | ✗ | RPN $COCO_{base}$ | CLIP image-text pair $C_Q$ | ✓ | - | 27.6 |
| Detic | ✓ | ✓ | RPN $COCO_{base}$ | Image-caption in $C_B \cup C_N$ | ✓ | 27.8 | 27.8 |
| RegionCLIP | ✓ | ✗ | RCNN $LVIS_{base}$ | Conceptual caption $C_Q$ | ✓ | 30.8 | 26.8 |
| PB-OVD | ✓ | ✓ | RPN $COCO_{base}$ | Image-labels in $C_B \cup C_N$ | ✓ | 32.3 | 30.7 |
| XPM | ✓ | ✗ | RPN $COCO_{base}$ | Image-caption in $C_B \cup C_N$ | ✓ | 29.9 | 27.0 |
| Proposed | ✓ | ✗ | WSPN $COCO_{base}$ | Image-labels in $C_B \cup C_N$ | ✗ | 31.5 | 27.4 |
| Proposed | ✓ | ✗ | WSPN $COCO_{base}$ | Image-labels in $C_B \cup C_N$ | ✓ | 35.9 | 31.5 |

FIG. 7

Table 2. Instance Segmentation (mAP) performances for MS-COCO and Open Images under constrained and generalized setting.

| Method | Caption Pre-training | Proposal Generator (MS-COCO/OpenImages) | Base Annotation | MS-COCO Constrained Novel | MS-COCO Generalized Novel | Open Images Constrained Novel | Open Images Generalized Novel |
|---|---|---|---|---|---|---|---|
| OVR-CNN | ✓ | - | ✓ | 14.1 | 8.3 | 24.9 | 16.8 |
| SB | ✓ | - | ✓ | 20.8 | 16.0 | 24.8 | 17.3 |
| BA-RPN | ✓ | RPN $COCO_{base}$/RPN $OpenImages_{base}$ | ✓ | 20.1 | 15.4 | 25.3 | 16.9 |
| Soft-Teacher | ✓ | RPN $COCO_{base}$/RPN $OpenImages_{base}$ | ✓ | 14.8 | 9.6 | 25.0 | 17.6 |
| Unbiased-Teacher | ✓ | RPN $COCO_{base}$/RPN $OpenImages_{base}$ | ✓ | 15.1 | 9.8 | 22.2 | 14.5 |
| OV-RCNN | ✓ | RPN $COCO_{base}$/RPN $OpenImages_{base}$ | ✓ | 20.9 | 17.1 | 23.8 | 17.5 |
| XPM | ✓ | RPN $COCO_{base}$/RPN $OpenImages_{base}$ | ✓ | 24.0 | 21.6 | 31.6 | 22.7 |
| Proposed | ✗ | WSPN $COCO_{base}$/WSPN $COCO_{base}$ | ✗ | 27.4 | 25.0 | 35.9 | 25.8 |

FIG. 8

Table 3. Object detection and Instance segmentation ablation analysis for GradCAM, Pseudo-label and Mask-RCNN training.

| Method | Language Supervision | Mask-RCNN Training | Base Annotation | Object Detection Constrained Novel/Base | Object Detection Generalized Novel/Base/All | Instance Segmentation Constrained Novel/Base | Instance Segmentation Generalized Novel/Base/All |
|---|---|---|---|---|---|---|---|
| GradCAM | $C_N$ | ✗ | ✗ | 8.6/0.0 | - | 5.2/0.0 | - |
| PL | $C_N$ | ✗ | ✗ | 17.3/0.0 | - | 14.8/0.0 | - |
| PL + Mask-RCNN | $C_N$ | ✓ | ✗ | 31.1/0.4 | 27.1/0.6/7.6 | 27.0/0.5 | 24.7/0.5/6.9 |
| PL + Mask-RCNN | $C_B \cup C_N$ | ✓ | ✗ | 32.4/22.4 | 29.3/22.8/24.5 | 27.4/18.4 | 25.0/18.3/20.1 |
| PL + Mask-RCNN | $C_B \cup C_N$ | ✓ | ✓ | 35.9/40.7 | 40.0/31.5/37.7 | 31.2/36.7 | 36.0/28.7/34.0 |

FIG. 9

Table 4. Ablation analysis for object detection and instance segmentation under different language supervision.

| Method | Language Supervision | Object Detection | | Instance Segmentatn | |
|---|---|---|---|---|---|
| | | Constrnd Novel | Genrlzd Novel | Constrnd Novel | Genrlzd Novel |
| OV-RCNN | Image-caption COCO | 27.5 | 22.8 | - | - |
| PB-OVD | Image-caption COCO | - | 29.1 | - | - |
| PB-OVD | Img-Cap COCO, SBU, VG | 32.3 | 30.8 | - | - |
| Proposed | Image-labels COCO | 35.9 | 31.5 | 31.0 | 28.3 |
| Proposed | Image-caption COCO | 36.1 | 31.8 | 31.5 | 28.8 |

FIG. 10

Table 5. Ablation analysis for object detection under different proposal generator. All models are fined-tuned on COCO base.

| Method | Proposal Generator | Constrained Novel | Generalized Novel |
|---|---|---|---|
| OV-RCNN | RPN COCO Base | 27.8 | 22.8 |
| PB-OVD | RCNN COCO Base | 32.3 | 30.8 |
| Proposed | Selective Search | 34.5 | 31.0 |
| Proposed | WSPN COCO Base | 35.9 | 31.5 |

FIG. 11

SYSTEMS AND METHODS FOR OPEN VOCABULARY INSTANCE SEGMENTATION IN UNANNOTATED IMAGES

CROSS REFERENCE(S)

The instant application is a nonprovisional of and claims priority under 35 U.S.C. 119 to U.S. provisional application No. 63/401,521, filed Aug. 26, 2022, which is hereby expressly incorporated by reference herein in its entirety.

TECHNICAL FIELD

The embodiments relate generally to image processing and machine learning systems, and more specifically to systems and methods for open vocabulary instance segmentation in unannotated images.

BACKGROUND

Object segmentation refers to the task of segregating objects in a complex visual environment. Instance Segmentation is a special form of image segmentation that deals with detecting instances of objects and demarcating their boundaries. Existing systems mostly rely on human-annotated image data to train segmentation models. For example, human-provided box-level annotations of predefined base classes may be used during supervised training. Human annotation, however, can be costly and time-consuming.

Therefore, there is a need for efficient instance segmentation in unannotated images.

BRIEF DESCRIPTION OF THE DRAWINGS

FIGS. 7-12 provide example data tables illustrating data experiments performance of the open vocabulary instance segmentation framework described in FIGS. 1-6, according to embodiments described herein.

Figure 1A:
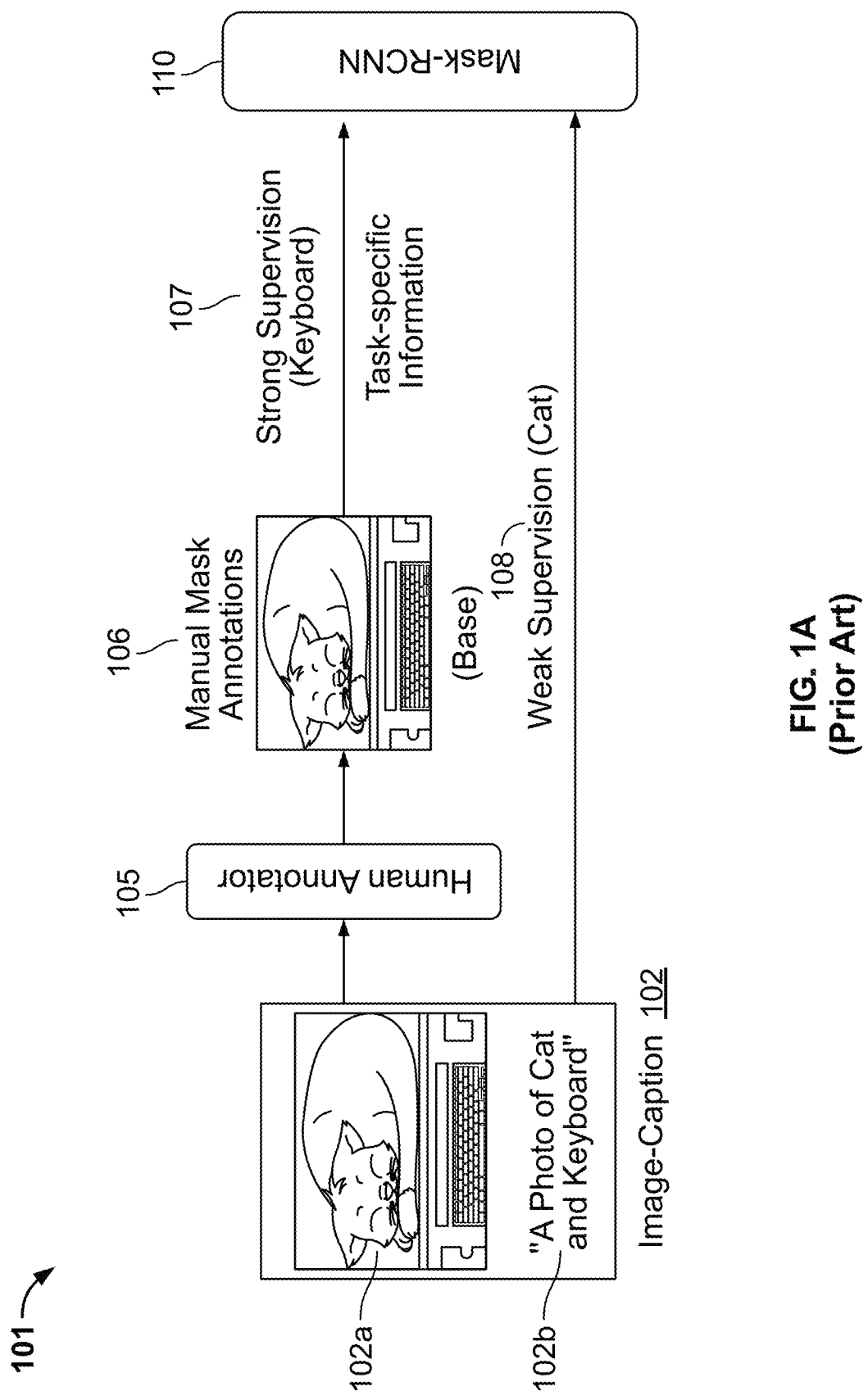
FIG. 1A is a simplified diagram illustrating an existing instance segmentation framework that relies on human-annotated instance-level labels, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Instance segmentation often employ neural network based models to detect objects in an image while also precisely segment each object at the pixel-level, e.g., to identify the set of pixels that belong to a "cat" in an image of a cat chasing a butterfly in a garden. Existing instance segmentation models are mostly trained for a pre-defined set of object categories, and in particular, often requires manual annotations of instance-level mask (e.g., a mask that covers an area of a target instance) for each object category to create annotated training data. Such human effort can be impractical with large training datasets. For example, assuming annotation takes on average 78 seconds per instance mask, a large-scale dataset with 2.1M instance-level mask annotations requires around 5 years of human labor alone. Even after extensive annotation, these training datasets are still limited to a small number of pre-defined object categories. Segmenting objects that may belong to a new category requires further annotation. Such instance segmentation models can hardly be scaled up to apply to a large number of categories.

In view of the need for efficient instance segmentation, embodiments described herein provide an open-vocabulary instance segmentation framework without manual mask annotations. First, given an image-caption pair, a weakly-supervised proposal network (WSPN) may be trained with image-level annotations (from the caption) on base categories as a proposal generator to generate proposals of bounding boxes for all objects in the image. Next, a pre-trained vision-language model may be adopted to select proposals of bounding boxes as pseudo bounding boxes for objects in the image. Given an object's text name (e.g., provided in the caption, such as "cat lying on a keyboard"), the name may be used as a text prompt (e.g., "an image of a cat") to localize this object in an image with the pre-trained vision-language model. To obtain a more accurate pseudo-mask that covers the entire object, iterative masking based on a GradCAM activation map of the image may be applied over the image given the vision-language model. Finally, a weakly-supervised segmentation (WSS) network may be trained with previously generated bounding box of the object and the GradCAM activation map to obtain pixel-level annotation of the object.

In this way, pseudo-mask annotations can be achieved for an image with base (pre-defined) and new (not previously defined) instance segmentation using open-vocabulary. In other words, no human-provided box-level or pixel-level annotations are used by the training framework, and the trained framework may be applied to segment objects whose categories are not previously defined. System efficiency for instance segmentation in a large dataset is thus largely improved.

FIG. 1A is a simplified diagram illustrating an existing instance segmentation framework 101 that relies on human-annotated instance-level labels, according to embodiments described herein. As shown in FIG. 1A, given an image-caption pair 102 containing an image 102a and an accompanying caption 102b of "A photo of cat and keyboard," traditional methods often entail a human annotator 105 to produce manual mask annotations 106 of pre-defined categories. Assuming the "keyboard" belongs to a pre-defined category while "cat" is not previously defined, the human annotator 105 may generate the manual mask annotation 106 (e.g., annotated instance-level mask or bounding box of pre-defined category "keyboard"), which may then be used to as a strong supervisory signal 107 to train a masked recurrent convolutional neural network (RCNN) 110. For example, the RCNN 110 may generate a predicted task-specific output indicating a "keyboard" (e.g., object detection or segmentation output) in the image. The predicted output may be compared with the manual mask annotation 106 of the "keyboard" to generate a cross-entropy loss for updating the Mask RCNN 110.

On the other hand, as the category of "cat" is not previously defined, and the human annotator 105 may not be able to provide manual annotation of "cat" from the image 102a, existing open-vocabulary methods may be adopted in detecting and/or segmenting such new categories from weak supervision signals. Weak supervisory signals 108 (e.g., "cat") may be obtained from the caption 102b (49, 54), knowledge distillation (15, 56) and/or pseudo-labeling (18, 30). For example, the mask RCNN 110 feature extractor is trained to learn new categories feature representation from the weak supervision signals which may help mask RCNN to generate an instance-level prediction relating to the "cat" in the image 102a and the weak supervisory signal 108 is used to compute the loss.

Therefore, such existing instance segmentation framework 101 often learns task-specific information (detection/segmentation) in a fully-supervised manner 107 and new category information with weak supervision 108. During training, this difference in strong and weak supervision signals in pre-defined and undefined categories would lead to overfitting (e.g., a bias towards the pre-defined categories). In addition, the existing instance segmentation framework 101 still largely relies on the manually-annotated pre-defined categories to improve their performances on new categories. Without fine-tuning on pre-defined categories, existing open-vocabulary methods lack task/domain specific knowledge and the performances on new categories will be negatively impacted.

Figure 1B:
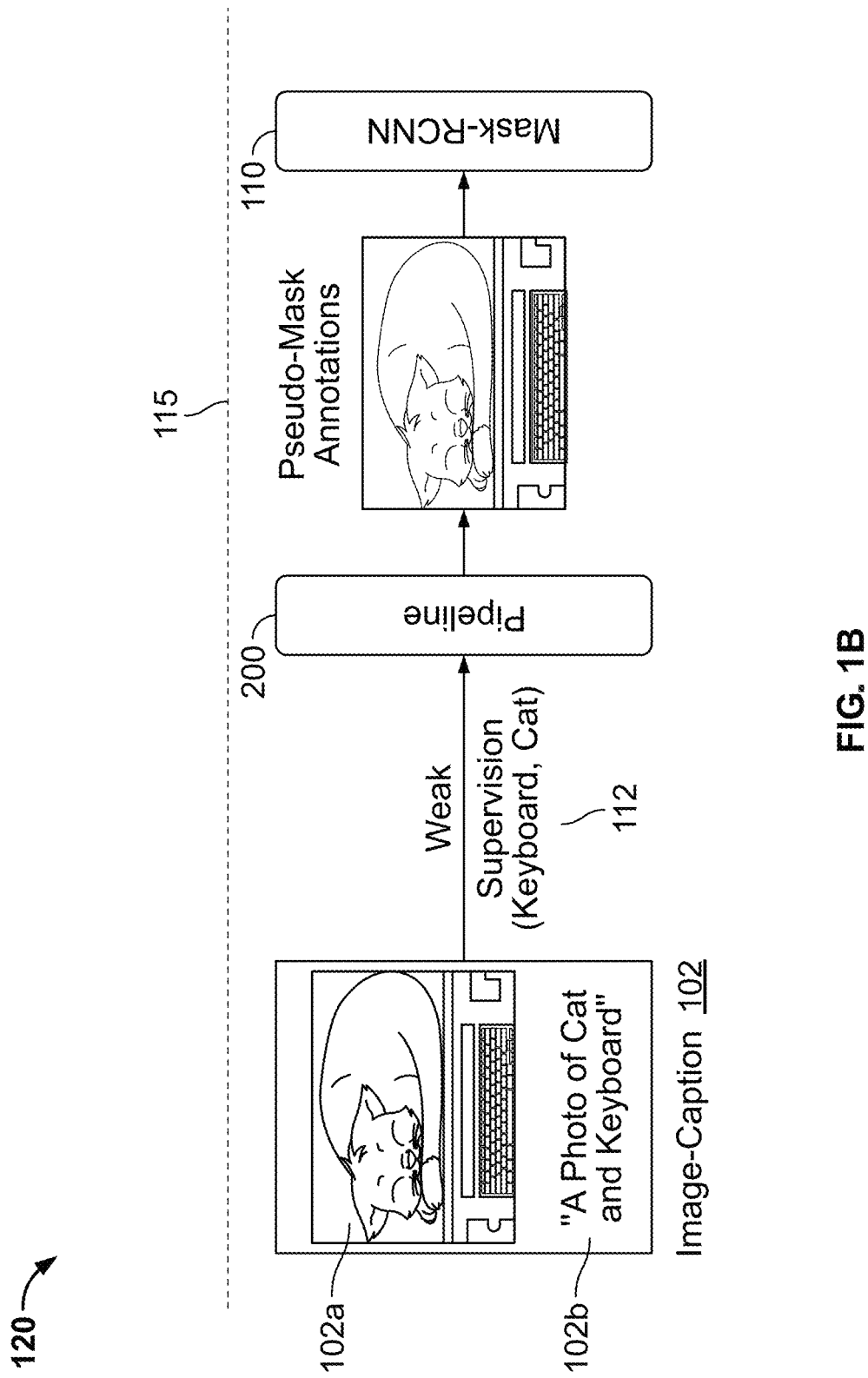
FIG. 1B is a simplified diagram illustrating a structure for an open-vocabulary object detection framework without any human annotations, according to one embodiment described herein.

FIG. 1B is a simplified diagram illustrating a structure for an open-vocabulary object detection framework 120 without any human annotations, according to one embodiment described herein. The open-vocabulary object detection framework 120 may include two stages: (i) pseudo-mask generation, and (ii) open-vocabulary instance segmentation. The goal of stage (i) is to generate box-level and pixel-level annotations by leveraging the region-text alignment property of a pre-trained vision-language model included in the pseudo mask generation pipeline 200. At stage (ii), the mask-RCNN 110 may be trained using the generated pseudo annotations from the pseudo mask generation pipeline 200.

Specifically, given the same image-caption pair 102 containing an image 102a and an accompanying caption 102b of "A photo of cat and keyboard" as shown in FIG. 1A, only weak supervisory signals 112 (e.g., obtained from the caption) are supplied to a pseudo mask generation pipeline 200. The pseudo mask generation pipeline 200 is configured to generate pseudo mask annotations 115 for both pre-defined categories (e.g., "Keyboard") and new categories (e.g., "cat") under weak supervision. For example, Detailed structure and operations of the pipeline 200 are described in relation to FIGS. 2A-2C.

In this way, without the labor-expensive annotation, the Mask RCNN 110 may be trained with pseudo-mask annotations 115 as ground-truth labels with much higher efficiency, in particular with large datasets. Also, without using both strong supervisory signals for pre-defined categories and weak supervisory signals for new categories, the overfitting problem in training can be alleviated, thus improving overall training performance of the Mask-RCNN 110.

Figure 2A:
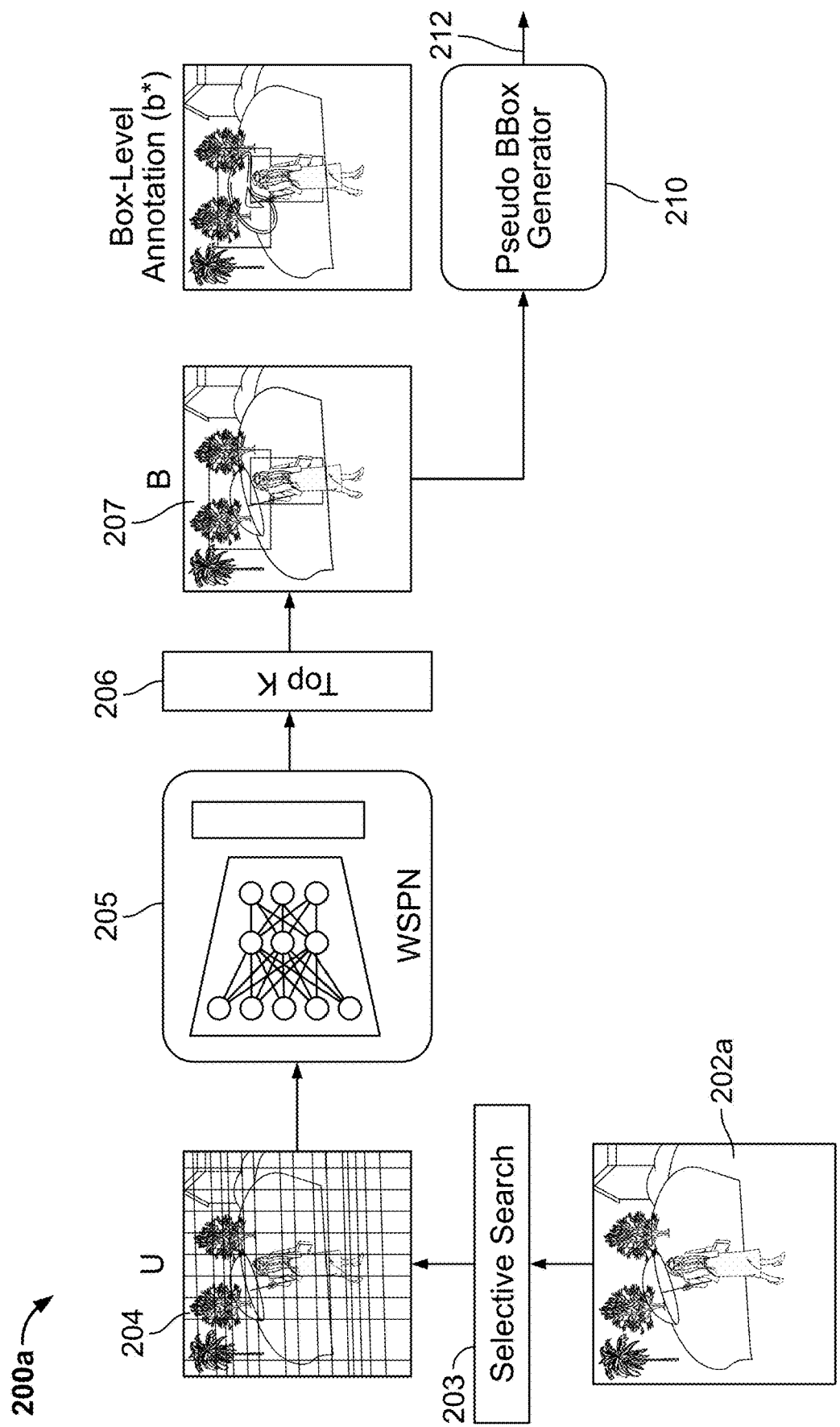
FIGS. 2A-2C jointly provide an example architecture of the pseudo mask generation pipeline described in FIG. 1B for open-vocabulary instance segmentation, according to embodiments described herein.
Figure 2B:
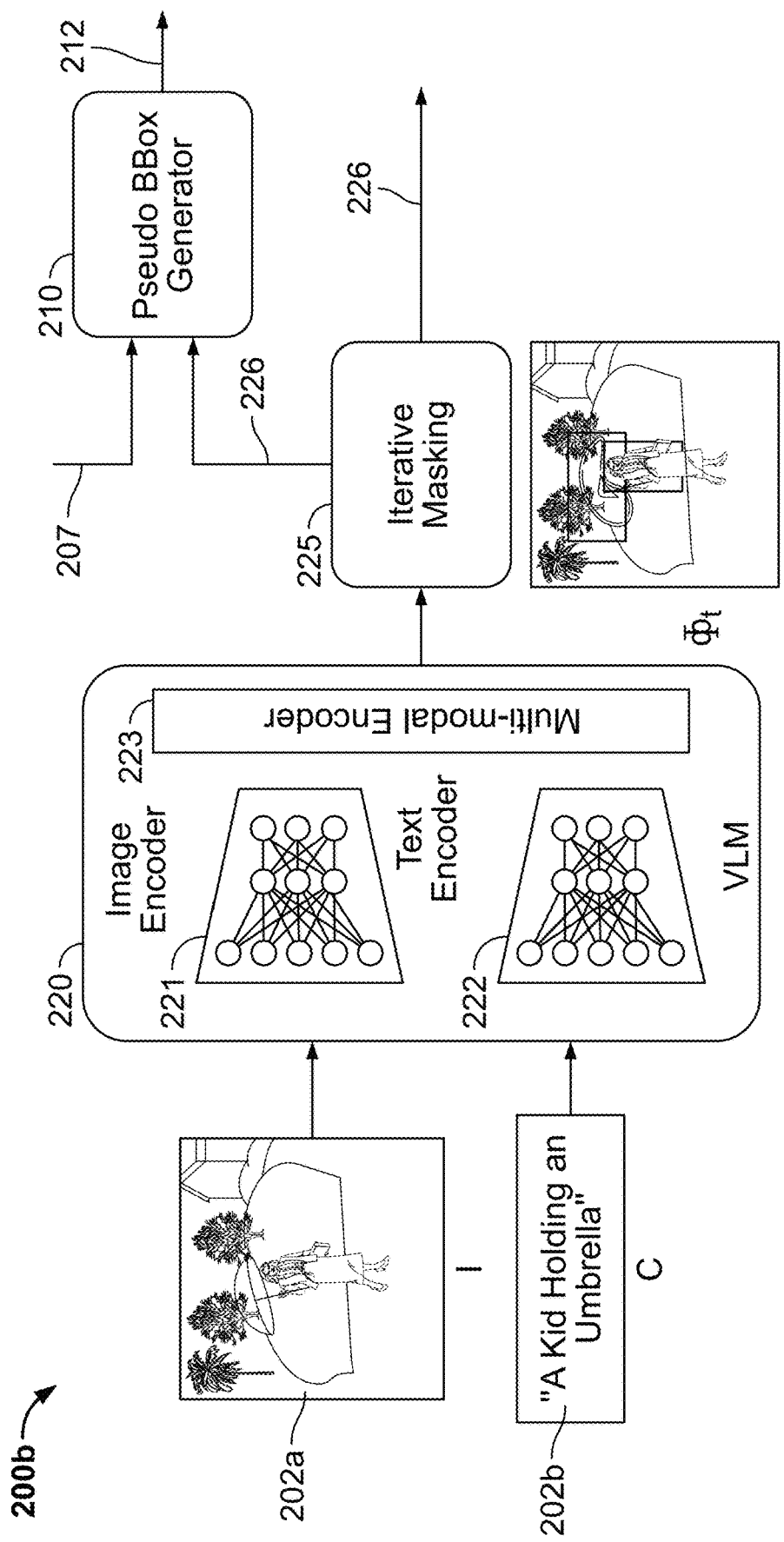
Figure 2C:
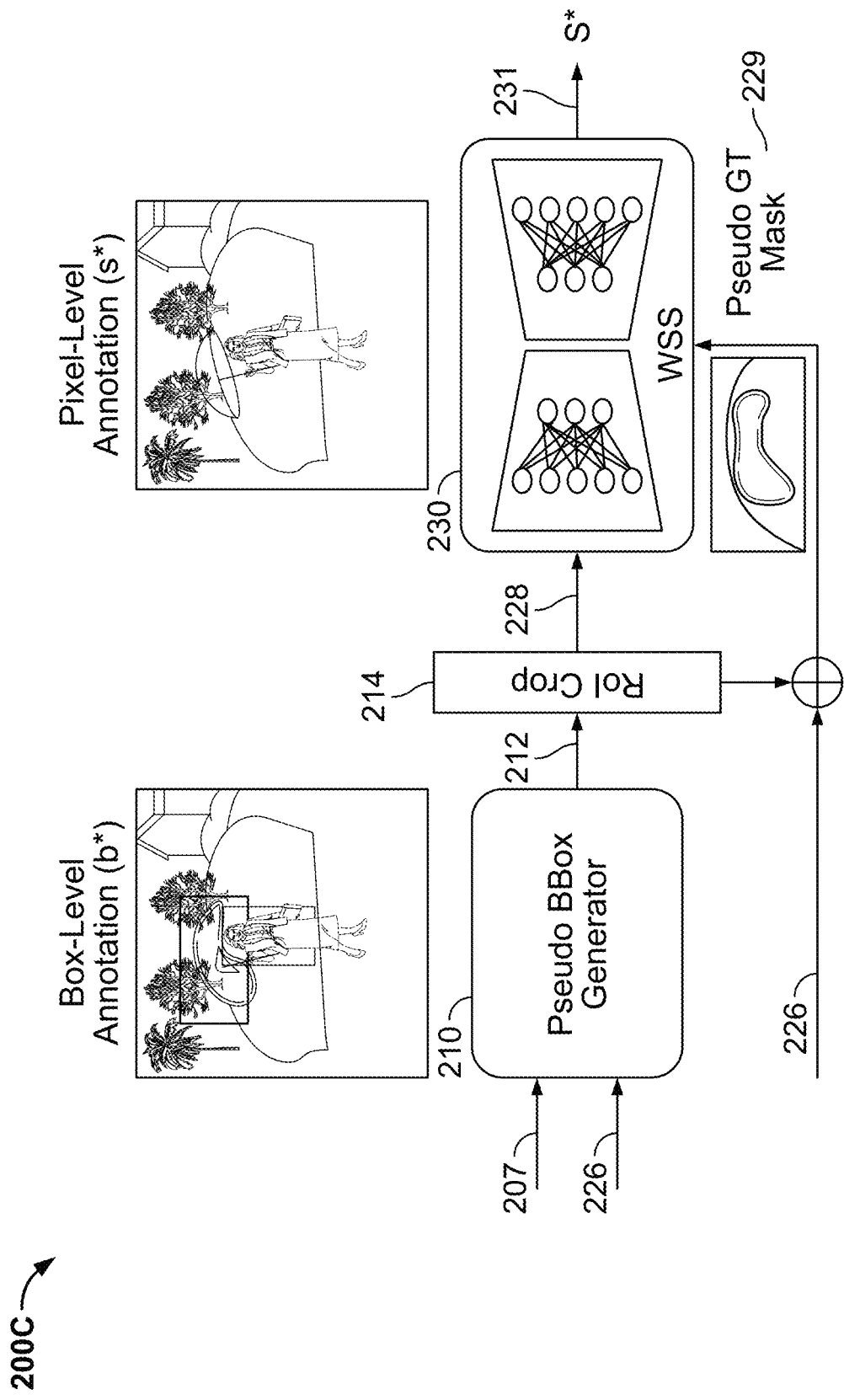

FIGS. 2A-2C jointly provide an example architecture of the pseudo mask generation pipeline 200 described in FIG. 1B for open-vocabulary instance segmentation, according to embodiments described herein. Specifically, FIG. 2A shows diagram 200a in which given an image-caption pair 202 (comprising image 202a and caption 202b), a pre-trained vision-language model 220 may generate an activation map for the object of interest ("umbrella") and enhance the activation map using iterative masking strategy into improved activation map 226. FIG. 2B shows a diagram 200b in which given the input image 202a, a weakly supervised proposal network (WSPN) 205 is used to generate box-level annotations, e.g., using the activation map 226 as a guidance function to select the best WSPN proposals covering the object ("umbrella"). FIG. 2C shows diagram 200c in which the input image may be cropped corresponding to the generated pseudo bounding box 212 and a weakly-supervised segmentation (WSS) model 230 is used to obtain pixel-level annotations 231 of the object ("umbrella").

With respect to FIG. 2A, the image I 202a and the caption C={$c_1, c_2, \ldots, c_{Nc}$} 202b are input to the vision-language model 220, where Nc is the number of words in the caption (including [CLS] and [SEP]). In the vision-language model 220, a text encoder 222 is utilized to encode the caption 202b into a text representation T∈ $\mathbb{R}^{N_c \times d}$ and an image encoder 221 is utilized to encode the image 202a into region representation R∈ $\mathbb{R}^{N_R \times d}$, where $N_R$ is the number of regions in the image. To fuse the information from both image and text encoders, a multi-modal encoder 223 with M consecutive cross-attention layers is utilized to obtain regions corresponding to the object of interest $c_t$ from the caption based on the text representations and image representations. For example, for the m-th cross-attention layer in the multi-modal encoder 223, the visual region attention scores $X_t^m$ for the object of interest $c_t$ is calculated as:

$$X_t^m = \text{Softmax}\left(\frac{h_t^{m-1} R^T}{\sqrt{d}}\right), \quad (1)$$

$$h_t^n = X_t^m R \quad (2)$$

where d is a scalar and $h_t^{m-1}$ is the hidden representation obtained from the previous (m−1)-th cross-attention layer in the multi-modal encoder 223. The final layer of the multi-modal encoder 223 generates an image-caption similarity score S.

In one embodiment, after obtaining attention scores $X_t^m$, Grad-CAM [41] is employed to visualize the activated regions. For example, the image-caption similarity (S) output from the multi-modal encoder's final layer is used to calculate the gradient with respect to the attention scores. The activation map for object $c_t$ is:

$$\phi_t = X_t^m \cdot \max\left(\frac{\partial S}{\partial X_t^m}, 0\right). \quad (3)$$

The generated activation map may then be enhanced by iterative masking 225. For example, during VLM training, an object's most discriminative regions easily get aligned towards object text representation. As a result, the activation map $\Phi_t$ is often localized towards the most discriminative region and may fail to cover the object completely. However, when the most discriminative regions are masked out, GradCAM activations are shifted towards other discriminative regions (see FIG. 3). Thus, iterative masking 225 is used to obtain better activation where the most activated part of the object is replaced with image mean. In this way, the new activation map is computed following Eq. (1) and (3). The iterative masking thus generate the final activation map 226 as:

$$\Phi_t = \bigcup_{i=1}^{G} \mathcal{IM}(\phi_t^i) \quad (4)$$

where G is a hyper-parameter indicating the number of masking iterations and IM(·) normalize and threshold $\Phi_t$ by 0.5. The activation map $\Phi_t$ 226 may then be used as a guidance function to generate box-level annotations 212 at the pseudo box generator 210 and pixel-level annotations as further discussed in relation to FIGS. 2B-2C.

With reference to FIG. 2B, to generate box-level annotations, bounding box proposals shall cover the activated region Φt in the activation map 226. Given an image I 202a, the WSPN 205 is supervised with image-level labels Y={y1, y2, ..., yC}, where yc=0 or 1 indicates the absence or presence of class c in image I 202a and C denotes total number of classes. For example, the image-level labels may be obtained from the caption 202b, e.g., "a kid holding an umbrella" indicating the presence of an "umbrella" in the image 202a.

In one embodiment, selective search 203 is adopted to generate a set of unsupervised bounding box proposals U={$u_1, u_2, \ldots, u_N$} 204, where N is the total number of bounding box proposals. Then, the Image I 202a and proposal U 204 are fed into a CNN backbone within the WSPN 205 to extract features. The WSPN 205 further comprises a region of interest (RoI) pooling layer to obtain RoI pooled feature vectors from the extracted features. The pooled feature vectors are then passed to a classification and detection branch to generate two matrices $W^{cls}, W^{det} \in \mathbb{R}^{C \times N}$. Then, $W^{cls}, W^{det}$ matrices are normalized along the category direction (column-wise) and proposal direction (row-wise) by the softmax layers σ(·) respectively. From $W^{cls}$ and $W^{det}$, the instance-level classification scores for object proposals are computed by the element-wise product $W_c = \sigma(W^{cls}) \odot \sigma(W^{det})$. and then the WSPN 205 computes image-level classification score for the cth class as $p_c = \Sigma_{i=1}^{N} w_{i,c}$. Thus, to train the WSPN 205, a classification loss may be computed as a cross-entropy loss between the image-level classification score $p_c$ and the image-level labels $y_c$.

In one implementation, the WSPN 205 learns to perform regression for selective search proposals 204 from pseudo regression targets $\hat{T} = \{\hat{t}(u_1), \hat{t}(u_1), \ldots, \hat{t}(u_N)\}$. Specifically, after obtaining the image-level classification score $p_c = \Sigma_{i=1}^{N} w_{i,c}$. for all the proposals, a diverse set of high-scoring non-overlapping proposals is selected by going through each class. These high-scoring non-overlapping proposals are selected as pseudo regression targets $\hat{T} = \{\hat{t}(u_1), \hat{t}(u_1), \ldots, \hat{t}(u_N)\}$ for remaining low-scoring non-overlapping proposal in each class.

Therefore, a regression loss may also be computed by comparing the set of unsupervised bounding box proposals U={$u_1, u_2, \ldots, u_N$} 204 with the pseudo regression targets $\hat{T} = \{\hat{t}(u_1), \hat{t}(u_1), \ldots, \hat{t}(u_N)\}$. The WSPN 205 can then be trained by the classification loss and the regression loss:

$$\mathcal{L}_{wspn} = -\sum_{c=1}^{C} y_c \log p_c + (1-y_c)\log(1-p_c) + \frac{1}{N}\sum_{u=1}^{N}\mathcal{L}_{smoothL1}(\hat{t}(u_i), u_i). \quad (5)$$

The Smooth L1 loss is used for doing box regression on object detection systems (as further described in Liu et al., SSD, Single shot multibox detector, European conference on computer vision. Springer, 2016 and Ren et al., Faster R-CNN: Towards real-time object detection with region proposal networks, Advances in neural information processing systems, 2015). In this way, the WSPN 205 is trained to localize and classify objects by minimizing the loss in Eq. (5).

After training, the trained WSPN model 205 is used to generate object proposals. A Top K selection module 206 than rank the object proposals by their respective confidence scores obtained from $W^{det}$ and the top K proposal candidates 207 over all the classes B={b1, b2, ..., bK} are selected. The top proposal candidates B 207 and the activation map Φt 226 described in relation to FIG. 2A are input to the pseudo box generator 210. The pseudo box generator 210 selects the proposal from B 207 that overlaps the most with the activation map Φt 226 as the pseudo box-bounding 212 (for the object "umbrella"):

$$b^* = \underset{b \in \mathcal{B}}{\operatorname{argmax}} \frac{\sum_b \Phi_t}{\sqrt{|b|}}, \quad (6)$$

where b* is the pseudo box-level annotation 212 and $\Sigma_b \Phi_t$ indicates the summation of the activation map values within a box proposal b, and |b| indicates the proposal area.

With reference to FIG. 2C, after the pseudo bounding box b* 212 is generated, an RoI cropping module 214 crops the original input image I 202a according 228 to the bounding box 212, to obtain the corresponding image patch 228. The cropped patch is then fed into a three-layer CNN network (referred to as the WSS 230) to perform pixel-level segmentation.

To supervise the WSS 230, pseudo ground-truth Θ 229 is generated by combining the activation map Φt 226 and the bounding box b* 212. Specifically, a number of Z points are sampled as foreground Fz={fi}i=1, ..., Z and background Bz={bi}i=1, ..., Z and each point is set to 1 or 0, respectively. Specifically, the foreground and background points are sampled from the most and least activated part of the activation map Φt 226 inside the bounding box b* 212.

The pseudo ground-truth Θ 229 is thus of size b*. Therefore, the network predictions of pixel level annotations 231 from WSS 230 is supervised by the pseudo ground-truth 229 only at sampled points. Thus, the segmentation loss obtained from these weakly-supervised points is computed as the sum of a first cross-entropy loss between the predicted foreground points in predicted pixel-level annotations 231 and the sampled foreground points from the pseudo ground-truth mask 229, and a second cross-entropy loss between the predicted background points in predicted pixel-level annotations 231 and the sampled background points from the pseudo ground-truth mask 229

$$\mathcal{L}_{wss} = \sum_{i=1}^{G} \mathcal{L}_{ce}(s^*(f_i), \Theta(f_i)) + \sum_{i=1}^{G} \mathcal{L}_{ce}(s^*(b_i), \Theta(b_i)), \quad (7)$$

where s* is the pseudo pixel-level annotation 231 of size P and $L_{ce}$ indicates cross-entropy loss.

Therefore, combining diagrams 200*a-c* in FIGS. 2A-2C, given an image I 202*a* and caption C 202*b*, a pseudo box-level b* is generated and pixel-level s* annotation 231 for the object of interest ct is generated. In some implementations, the pseudo-mask annotations are generated for a pre-defined set of object categories obtained from training vocabulary.

In one implementation, after generating pseudo-mask annotations (e.g., instance-level 212 and pixel-level 231), an open-vocabulary instance segmentation model may be trained. Specifically, the mask-RCNN 110 may be employed as the instance segmentation model, where a class-agnostic mask head is utilized to segment objects and the classification head is replaced with embedding head $h_{emb}$. Given the image I 102*a*, an encoder network extracts image features and region embeddings, $R=\{r_i\}_{i=1,\ldots,N_r}$, are obtained by RoI align followed by a fully connected layer within the mask-RCNN 110, where Nr denotes the number of regions. The similarity between the region and text embedding pair is calculated as follows:

$$p(r_i, c_j) = \frac{\exp(h_{emb}(r_i) \cdot c_j)}{\exp(h_{emb}(r_i) \cdot bg) + \sum_k \exp(h_{emb}(r_i) \cdot c_k)}, \quad (8)$$

where, $C=\{bg, c_1, c_2, \ldots, c_{Nc}\}$, are object vocabulary text representation obtained from a pre-trained text encoder encoding the text description of the background and pre-defined categories, where $N_C$ is the training object vocabulary size.

Thus, the similarity score computed in Eq. (8) pushes negative pairs (e.g., region and text do not match) away and positive pairs (e.g., region and text match) are pulled together in the sematic space, using a cross entropy loss computed between a predicted region and an instance-level pseudo-mask annotation (e.g., bounding box b* 212 generated in FIG. 2B). The class-agnostic mask head is thus trained by minimizing a segmentation loss computed by comparing a predicted mask and the pixel-level annotation s* 231.

During inference, the similarity between the region proposals embedding and text embedding from a group of object classes of interest is calculated, according to Eq. (8). The region is then assigned to a class with the highest similarity score. The open-vocabulary instance segmentation model then generates a predicted region for the class (e.g., "umbrella") having the highest similarity score.

Figure 3:
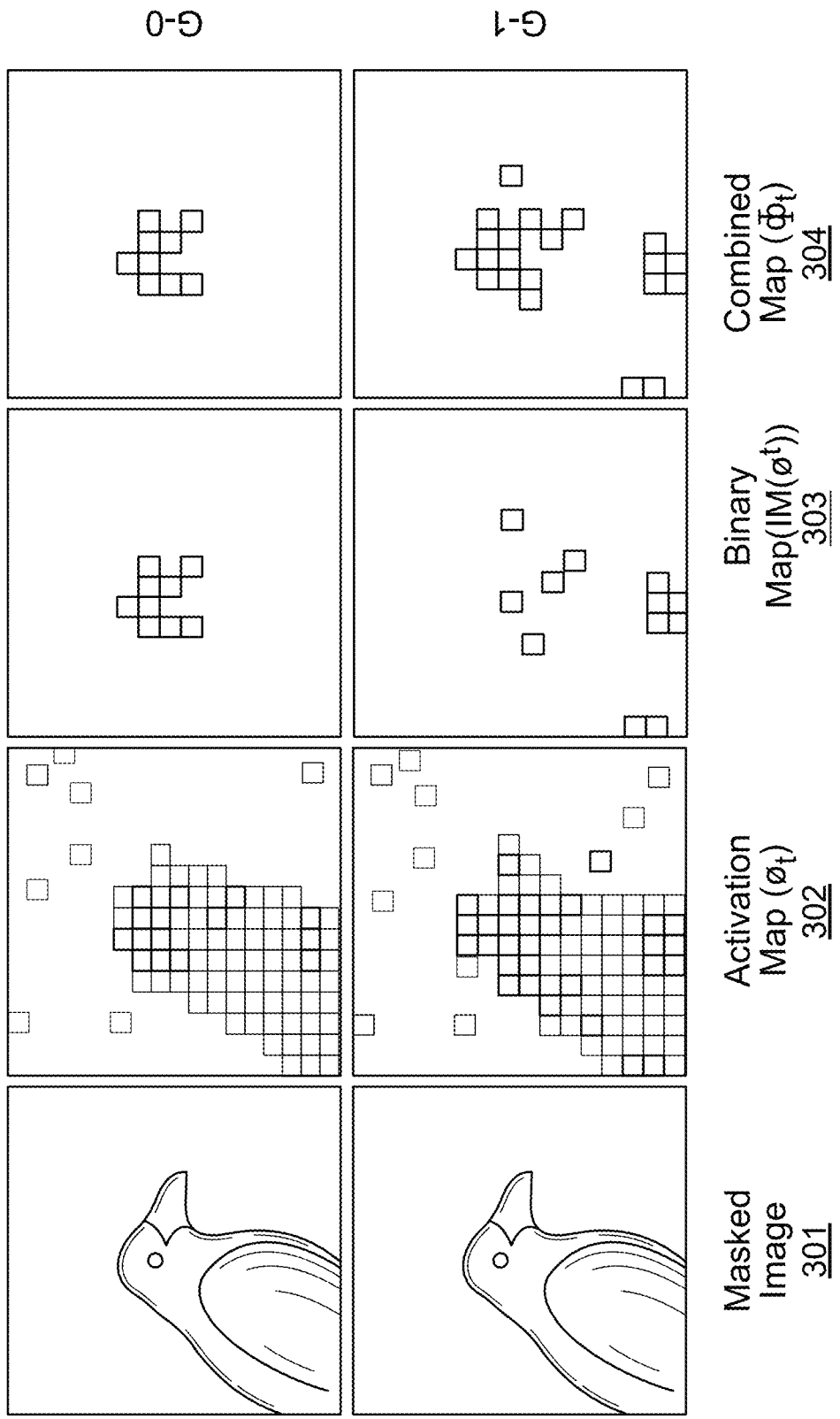
FIG. 3 is a simplified diagram illustrating a comparison between activation map generated at different parameters, according to embodiments described herein.

FIG. 3 is a simplified diagram illustrating a comparison between activation map 226 generated at different parameters, according to embodiments described herein. From left to right columns, FIG. 3 shows the masked images 301, activation maps 302 (GradCAM map), a binary map 303 of the original image (e.g., IM(·) indicating whether a pixel is masked or not), and combined map 304 (e.g., 226 in FIGS. 2A-2C). For G=0, in the masked image column 301, the most discriminative parts of an object (bird's head) gets activated (bird's head). After masking, for G=1, the activation map has shifted to less discriminative part (bird's body). Thus, by combining activation from both steps G=0 and G=1, a better activation map trying to cover entire object Φt can be resulted.

Computer and Network Environment

Figure 4:
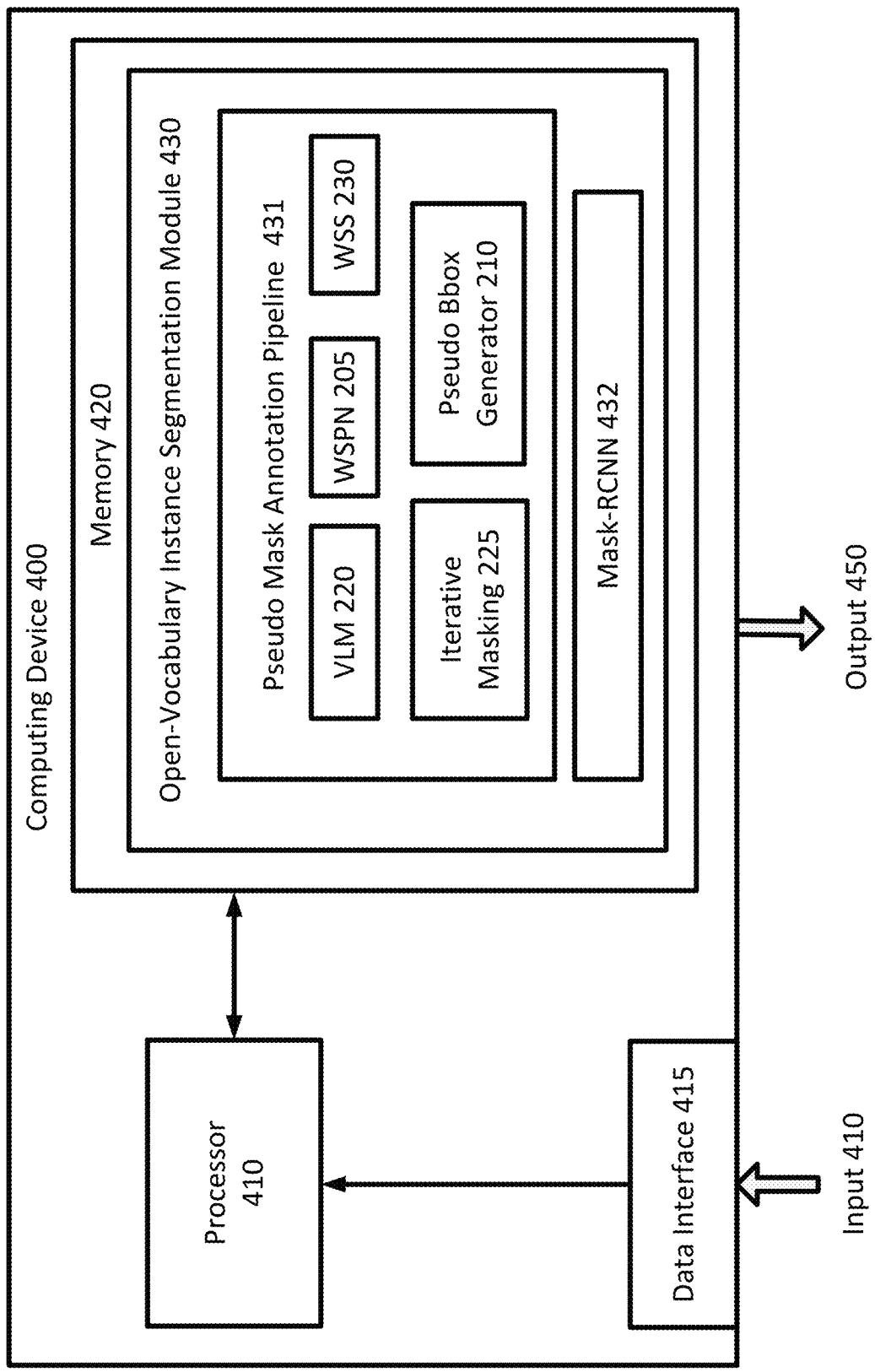
FIG. 4 is a simplified diagram illustrating a computing device implementing the instance segmentation framework described in FIG. 4, according to one embodiment described herein.

FIG. 4 is a simplified diagram illustrating a computing device implementing the instance segmentation framework described in FIG. 4, according to one embodiment described herein.

As shown in FIG. 4, computing device 400 includes a processor 410 coupled to memory 420. Operation of computing device 400 is controlled by processor 410. And although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein. For example, as shown, memory 420 includes instructions for an open vocabulary instance segmentation module 430 that may be used to implement and/or emulate the systems and models, and/or to implement any of the methods described further herein. An open vocabulary instance segmentation module 430 may receive input 440 such as an input training data (e.g., image-caption pairs) via the data interface 415 and generate an output 450 which may be a predicted caption.

The data interface 415 may comprise a communication interface, a user interface (such as a voice input interface, a graphical user interface, and/or the like). For example, the computing device 400 may receive the input 440 (such as a training dataset) from a networked database via a communication interface. Or the computing device 400 may receive the input 440, such as an image, from a user via the user interface.

In some embodiments, the open vocabulary instance segmentation module 430 is configured to generate classification of instances within an input image. The open vocabulary instance segmentation module 430 may further include a pseudo mask annotation pipeline 431 and a mask-RCNN 432 (e.g., similar to 110 in FIG. 1B). The pseudo mask annotation pipeline 431 may be operated to generate pseudo mask annotations (e.g., 115 in FIG. 1B), which may be used to train the mask-RCNN 432.

In one embodiment, the pseudo mask annotation pipeline 431 may be operated in a similar way as described in diagrams 200*a-c* in FIGS. 2A-2C. For example, the pseudo mask annotation pipeline 431 may comprise submodules such as the VLM 220, WSPN 205, WSS 230, iterative masking 225, and pseudo bounding box generator 210.

In one embodiment, the open vocabulary instance segmentation module 430 and one or more of its submodules 431-432 may be implemented via an artificial neural network. The neural network comprises a computing system that is built on a collection of connected units or nodes, referred to as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 420 as a structure of layers of neurons, and parameters describing the non-linear transformation at each neuron and the weights associated with edges connecting the neurons. An example neural network may be RCNN, and/or the like.

In one embodiment, the neural network based open vocabulary instance segmentation module 430 and one or more of its submodules 431-432 may be trained by updating the underlying parameters of the neural network based on the loss described in relation to FIGS. 1B and 2A-2C. For example, the loss described in Eq. (5), (7) is a metric that evaluates how far away a neural network model generates a predicted output value from its target output value (also referred to as the "ground-truth" value). Given the loss computed according to Eq. (5)(7), the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to its target output value.

In one embodiment, the open vocabulary instance segmentation module 430 and its submodules 431-134 may be implemented by hardware, software and/or a combination thereof.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5:
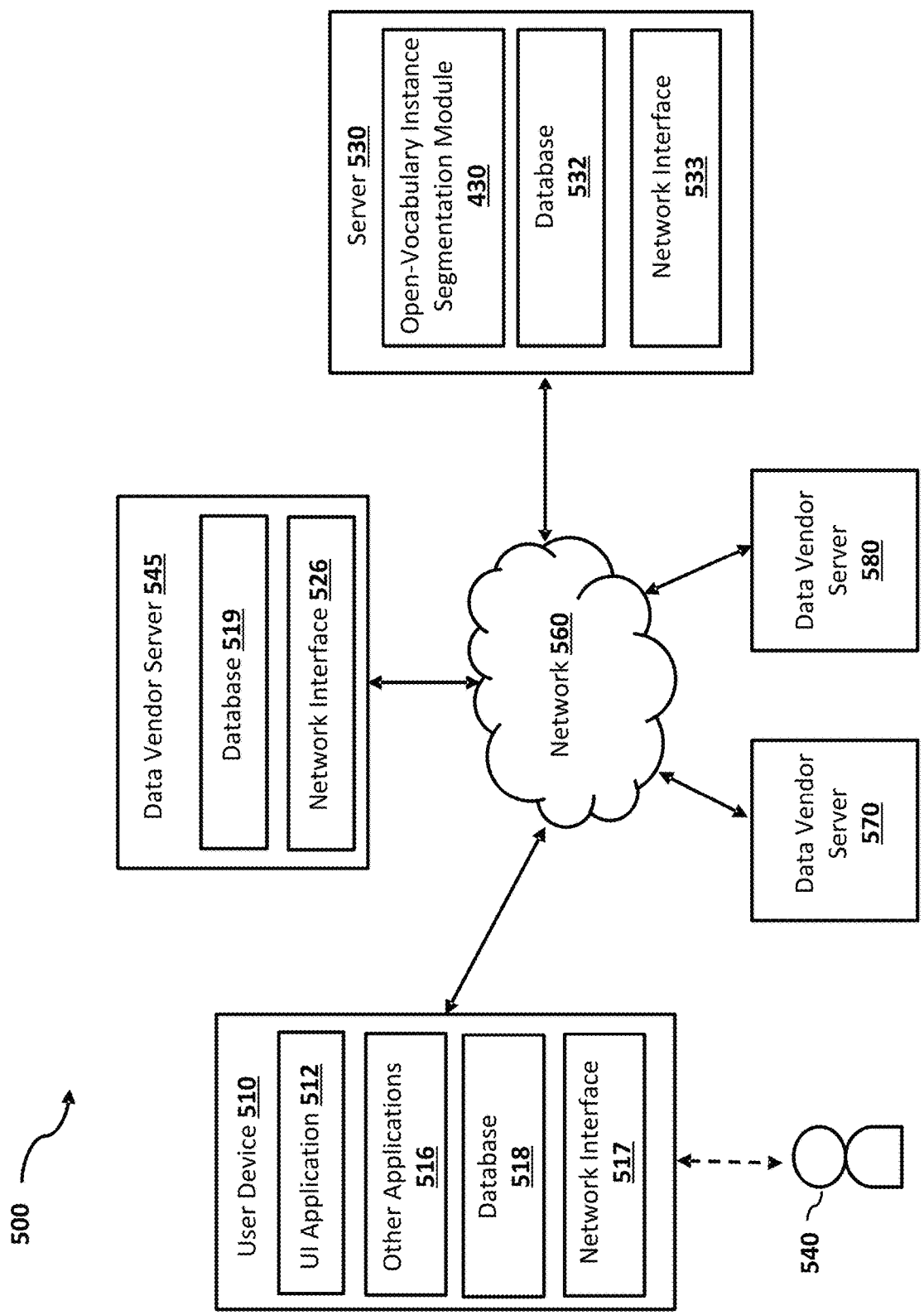
FIG. 5 is a simplified block diagram of a networked system suitable for implementing the instance segmentation framework described in FIGS. 1-4 and other embodiments described herein.

FIG. 5 is a simplified block diagram of a networked system suitable for implementing the instance segmentation framework described in FIGS. 1-4 and other embodiments described herein. In one embodiment, block diagram 500 shows a system including the user device 510 which may be operated by user 540, data vendor servers 545, 570 and 580, server 530, and other forms of devices, servers, and/or software components that operate to perform various methodologies in accordance with the described embodiments. Exemplary devices and servers may include device, stand-alone, and enterprise-class servers which may be similar to the computing device 400 described in FIG. 4, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating an incidence identification in an image from the server 530 and display the message via the UI application 512. In other embodiments, user device 510 may include additional or different modules having specialized hardware and/or software as required.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view an incidence identification in an image.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 519 adapted to communicate with data vendor server 545 and/or the server 530. In various embodiments, network interface component 519 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts one or more of the databases 503a-n (or collectively referred to as 503) to provide training datasets including unannotated images to the server 530. The database 503 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 503, via the network interface 526, to the server 530.

The server 530 may be housed with the open-vocabulary instance segmentation module 430 and its submodules described in FIG. 4. In some implementations, module 430 may receive data from database 519 at the data vendor server 545 via the network 560 to generate an instance detection. The generated instance detection may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the open-vocabulary instance segmentation model 430. In one implementation, the database 532 may store previously generated instances, and the corresponding input feature vectors.

In some embodiments, database 532 may be local to the server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component 533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

Figure 6:
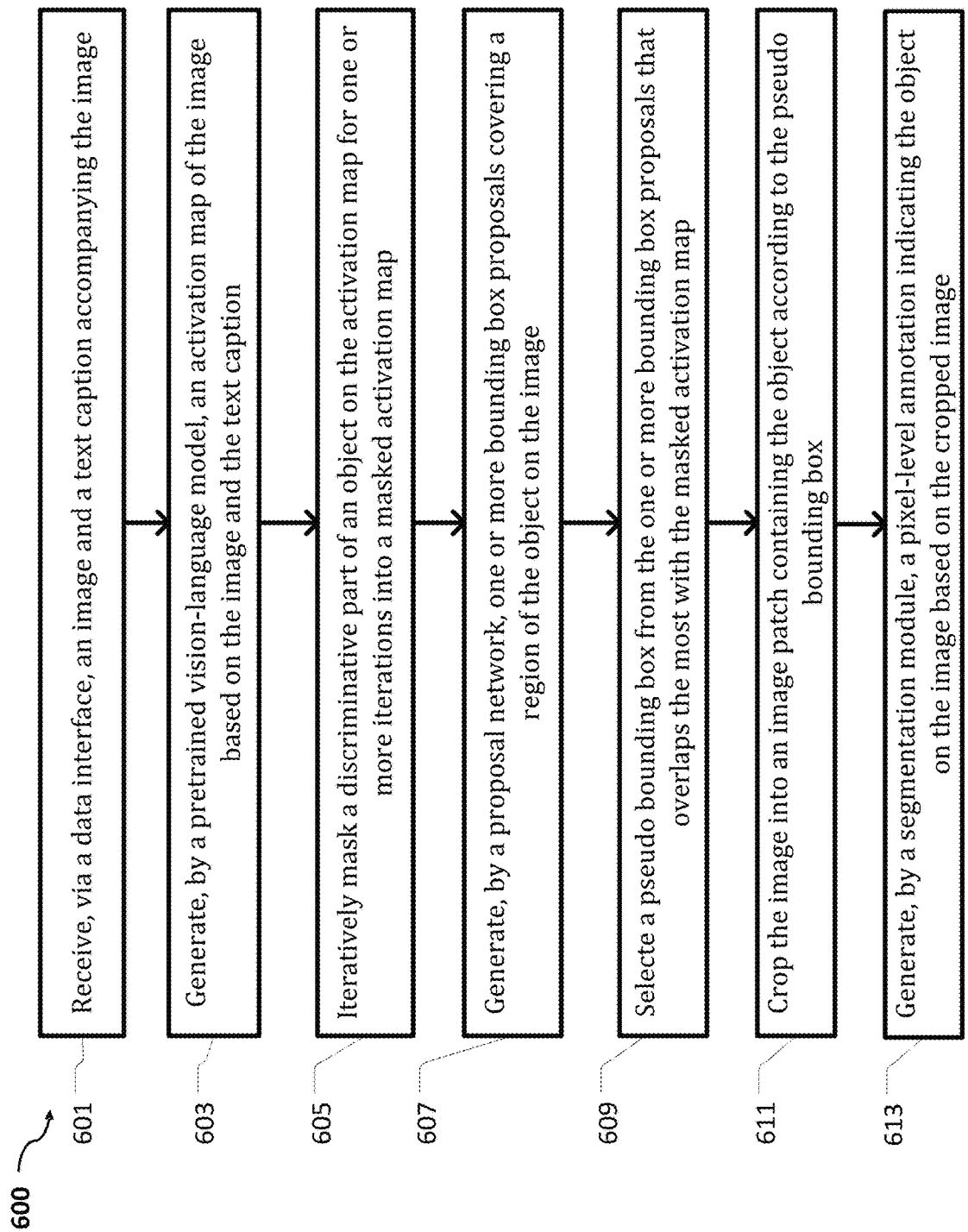
FIG. 6 provides an example logic flow diagram illustrating an example method of open vocabulary instance detection in an unannotated image based on the network architecture described in FIGS. 2A-2C, according to embodiments described herein.

FIG. 6 provides an example logic flow diagram illustrating an example method 600 of open vocabulary instance detection in an unannotated image based on the network architecture described in FIGS. 2A-2C, according to embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to an example operation of the open vocabulary instance segmentation module 430 (e.g., FIGS. 4-5).

As illustrated, the method 600 includes a number of enumerated steps, but aspects of the methods may include additional steps before, after, and in between the enumerated steps. In some aspects, one or more of the enumerated steps may be omitted or performed in a different order.

At step 601, an image (e.g., 202a in FIG. 2A) and a text caption (e.g., 202b in FIG. 2B) accompanying the image may be received via a data interface (e.g., 415 in FIG. 4, or 533 in FIG. 5). For example, At step 603, a pretrained vision-language model (e.g., 220 in FIG. 2A) may generate an activation map of the image based on the image and the text caption. For example, the pretrained vision-language model (e.g., 220 in FIG. 2A) may comprise an image encoder (e.g., 221 in FIG. 2A), a text encoder (e.g., 222 in FIG. 2A) and a multi-modal encoder (e.g., 223 in FIG. 2A). The image encoder may encode the image comprising a set of regions into an image representation. The text encoder may encode the caption comprising a set of objects of interest into a text representation. The multi-modal encoder may generate attention scores between the set of regions and the set of objects based on the image representation and the text representation, e.g., according to Eq. (1). A GradCAM activation map of the image may then be generated based on the attention scores, e.g., according to Eq. (3).

At step 605, a discriminative part of an object on the activation map may be iteratively masked for one or more iterations into a masked activation map. For example, the discriminative part on the activation map may be replaced with an image mean at each iteration, according to Eq. (4).

At step 607, a proposal network (e.g., WSPN 205 in FIG. 2B) may generate one or more bounding box proposals covering a region of the object on the image. For example, a set of bounding box proposals (e.g., 204 in FIG. 2B) covering different regions of the image may be generated. The proposal network may then generate pooled feature vectors relating to regions of interest on the image based on the image and the set of bounding box proposals. A detection matrix and a classification matrix may then be generated based on the pooled feature vectors. The one or more bounding box proposals may then be selected from the set of bounding box proposals based on proposal confidence scores computed from the detection matrix.

In one embodiment, the proposal network may be trained by computing instance-level classification scores and image-level classification scores from the detection matrix and the classification matrix. A classification loss may then be computed based on a binary image label and the image-level classification scores, and a regression loss is computed based on the set of bounding box proposals and pseudo regression targets. The proposal network is then updated based on the classification loss and the regression loss.

At step 609, a pseudo bounding box (e.g., b* 212 in FIG. 2B) may be selected from the one or more bounding box proposals that overlaps the most with the masked activation map, e.g., according to Eq. (6).

At step 611, the image may be cropped into an image patch containing the object according to the pseudo bounding box.

At step 613, a segmentation module (e.g., WSS 230 in FIG. 2C) may generate a pixel-level annotation indicating the object on the image based on the cropped image. In one embodiment, the segmentation module may be trained by sampling a set of foreground points and a set of background points from the masked activation map. The set of foreground points are sampled from a most active part of the masked activation map within the pseudo bounding box, and the set of background points are sampled from a least active part of the masked activation map within the pseudo bounding box. Thus, a first loss is computed based on the pixel-level annotation and the set of foreground points and a second loss is computed based on the pixel-level annotation and the set of background points, e.g., according to Eq. (7). The segmentation module is then updated based on the first loss and the second loss.

In one embodiment, an instance segmentation model may be trained using the pseudo bounding box and/or the pixel-level annotation as ground truth. For example, a training image may be encoded into a set of region embeddings, and a training caption may be encoded into a set of text embeddings. Similarity scores may be computed between the set of region embeddings and the set of text embeddings, e.g., according to Eq. (8). A loss may be computed based on the similarity scores. The instance segmentation model may then be updated based on the loss.

Example Data Experiment Performance

Example data experiments are conducted on MS-COCO (Lin et al., Microsoft coco: Common objects in context, in European conference on computer vision, pages 740-755, Springer, 2014) with data split of 48 base categories and 17 novel categories. The processed COCO dataset contains 107,761 training images and 4,836 test images.

Example data experiments are conducted on Open Images (Kuznetsova et al., the open images dataset v4. International Journal of Computer Vision, 128(7):1956-1981, 2020) to verify the effectiveness of our method on the large-scale dataset. The Open Images dataset consists of 300 categories with a class split of 200 base categories (frequent objects) and 100 novel categories (rare objects). Image-labels obtained from MS-COCO and Open Images are used to learn the novel category information. Experiments are also conducted using image-caption datasets to show method 600's effectiveness irrespective of training vocabulary.

Following open-vocabulary methods, for both detection and seg-mentation tasks, the mean Average Precision at intersection-over-union (IoU) of 0.5 (mAP50) are reported. Following zero-shot settings, novel category performance for both constrained setting and generalized setting are reported. In constrained setting, the model is evaluated only on novel class test images and in generalized setting, the model is evaluated on both base and novel class test images.

In pseudo-mask generation framework, pre-trained ALBEF (Li et al., Align before fuse: Vision and language representation learning with momentum distillation, Advances in neural information processing systems, 34:9694-9705, 2021) is adopted as the vision-language model 220. All pseudo-mask generation experiments are conducted using ALBEF due to the good region-text alignment when image and caption pair are present. Following ALBEF, the cross-attention layer m used for Grad-CAM visualization is set to 8. For attention score, the original setting of ALBEF is used and no additional modification is performed. Note that other pre-trained vision-language models can also be integrated into the pipeline 200a without major modifications. For the proposal generation pipeline, the WSPN network is trained using COCO base image-labels and the top K proposals candidates is set to 50. The WSPN network is trained for 40k iterations with learn rate 0.001 and weight decay 0.0001. For iterative masking, the hyper-parameter G is set to 3. In the segmentation pipeline, for each patch, the segmentation network is trained for 500 iterations with lr 0.25.

For fair-comparison, Mask R-CNN 110 with a ResNet50 backbone is used as the open-vocabulary instance segmentation model. During pseudo-mask training, Mask-RCNN is trained on MS-COCO and OpenImages using batch size 8 on 8 A5000 GPUs for 90k iterations. Text embeddings obtained from a pre-trained CLIP text encoder. During pseudo-mask training, the initial learning rate is set 0.01 and the background class weight is set to 0.2 to improve the recall of novel classes. For base fine-tuning, the initial learning rate is set to 0.0005 and the weight decay is set to 0.0001. Fine-tuning is run for 90k iterations where the learning rate is updated by a decreasing factor of 0.1 at 60k and 80k iterations.

Table 1 of FIG. 6 compares method 600 with previous established open-vocabulary detection methods on the MS-COCO dataset. Compared to weakly-supervised methods such as WSDDN (Bilen et al., Weakly supervised deep detection networks. In Proceedings of the IEEE conference on computer vision and pattern recognition, pages 2846-2854, 2016) and zero-shot methods such as SB (Bansal et al., Zero-shot object detection, in Proceedings of the European Conference on Computer Vision (ECCV), pages 384-400, 2018), DELO (Zhu et al., Don't even look once: Synthesizing features for zero-shot detection, in Proceedings of the IEEE/CVF Conference on Computer Vision and Pattern Recognition, pages 11693-11702, 2020), method 600 outperforms them by a large margin.

OV-RCNN (Zareian et al., Open-vocabulary object detection using captions, in Proceedings of the IEEE/CVF Conference on Computer Vision and Pattern Recognition, pages 14393-14402, 2021), XPM (Huynh et al., Open-vocabulary instance segmentation via robust cross-modal pseudo-labeling, In Proceedings of the IEEE/CVF Conference on Computer Vision and Pattern Recognition, pages 7020-7031, 2022) are OVD methods based on caption pre-training and our method trained with only pseudo-labels improves the novel category performance by 20.2% and 2.4% in generalized setting, respectively. Also, when compared to the method which leverages pre-trained vision-language models such as ViLD (Gu et al., Open-vocabulary object detection via vision and language knowledge distillation. arXiv preprint arXiv:2104.13921, 2021), RegionCLIP (Zhong et al., Regionclip: Region based language-image pretraining. In Proceedings of the IEEE/CVF Conference on Computer Vision and Pattern Recognition, pages 16793-16803, 2022), PB-OVD (Gao et al., Towards open vocabulary object detection without human-provided bounding boxes. arXiv preprint arXiv:2111.09452, 2021), method 600 with just pseudo-labels produces similar performance. However, with fine-tuning on base annotations, method 600 significantly outperforms ViLD, RegionCLIP, PB-OVD by 13.3%, 14.9% and 2.8% in generalized setting, respec-tively. This is because with fine-tuning, the model learns task/domain specific information from noise-free annotations, boosting the novel category performance. Even without base annotations, method 600 outperforms most of the existing OVD methods supervised using base annotations. This shows the effectiveness of our method for learning quality representation for novel categories. Specifically, the quality representation is learned due to the quality proposal generated by WSPN compared to fully-supervised RPN and RCNN proposal generators.

Table 2 of FIG. 8 compares our method with previous open-vocabulary instance segmentation methods on the MS-COCO and Open Images datasets. SB and BA-RPN (Zheng et al., Zero-shot instance segmentation, in Proceedings of the IEEE/CVF Conference on Computer Vision and Pattern Recognition, pages 2593-2602, 2021) are zero-shot methods which utilize different background modelling strategies and caption pre-training to learn novel categories. Compared to these, method 600 improves the novel category performance by a large margin on both datasets and settings. When compared against conventional pseudo-labelling methods, such as soft-teacher (Xu et al., End-to-end semi-supervised object detection with soft teacher, in Proceedings of the IEEE/CVF International Conference on Computer Vision, pages 3060-3069, 2021) and un-biased teacher (Liu et al., Unbiased teacher for semi-supervised object detection, arXiv preprint arXiv:2102.09480, 2021), method 600 significantly improves on MS-COCO and Open Images datasets. Finally, when com-pared to open-vocabulary methods such as OV-RCNN, XPM, method 600 outperforms by 4.6 and 3.1 mAP in COCO and Open Images in generalized setting, respectively. All these comparisons are performed against our method trained with just pseudo-labels and no base annotation is used during training. This shows the effectiveness of our overall pseudo-mask generation pipeline.

Table 3 of FIG. 9 analyzes the quality of pseudo-labels generated from the GradCAM activation map and method 600 (PL). After pseudo-label generation, it is shown how Mask-RCNN training helps to improve the quality of prediction compared to pseudo-labels. Finally, it is shown how fine-tuning on base annotation improves method 600. In the first row, the pseudo-mask for novel samples are evaluated, where the pseudo-mask is generated by normalizing and threshold the GradCAM activation map. In the second row, the pseudo-mask for novel samples are evaluated, where the pseudo-mask is generated by our method. From Table 3, it is observed that the quality of the pseudo-mask generated by method 600 for novel samples is much better than the GradCAM activation map as a pseudo-mask. From Table 3 third row, it is observed that training a Mask-RCNN on pseudo-labels improves the performance on novel categories by modelling fine-grained information. By including pseudo-labels from base categories, it is observed that the performance on novel samples further improves. Finally, when fine-tuning on base annotations, the performance on novel categories significantly improves by learning task/domain specific information from noise-free manual annotations.

Given an image and caption pair, method 600 can generate a pseudo-mask leveraging a pre-trained vision-language model. Thus to analyze the effect of captions, experiments are conducted between human-provided captions and pseudo-captions generated from image-labels. As show in Table 4 of FIG. 10, human-provided captions and image-labels based pseudo-caption produce similar performance showing that irrespective of caption type, method 600 can generate pseudo-mask for the object of interest (see supplementary material for visual comparison). Therefore, method 600 is more data efficient as it requires cheap image-labels compared to human-provided captions. Table 4 compares method 600 with other pseudo-label generation methods trained with extra language supervision. Method 600, with lesser language supervision, outperforms PB-PVD by a considerable margin.

In general, better quality of proposal provides better quality of pseudo-labels. Therefore, pseudo-labels are generated using different proposal generator and the results are reported in Table 5 of FIG. 11. As shown in Table 5, method 600 trained with WSPN as proposal generator is produces better performance com-pared to methods which rely on fully-supervised proposal generator such as RPN and RCNN. Also when compared to selective search as proposal generator, WSPN demonstrates better performance for novel categories. This is because WSPN refines selective search proposals and localizes them towards objects producing better quality proposals.

Figure 12:
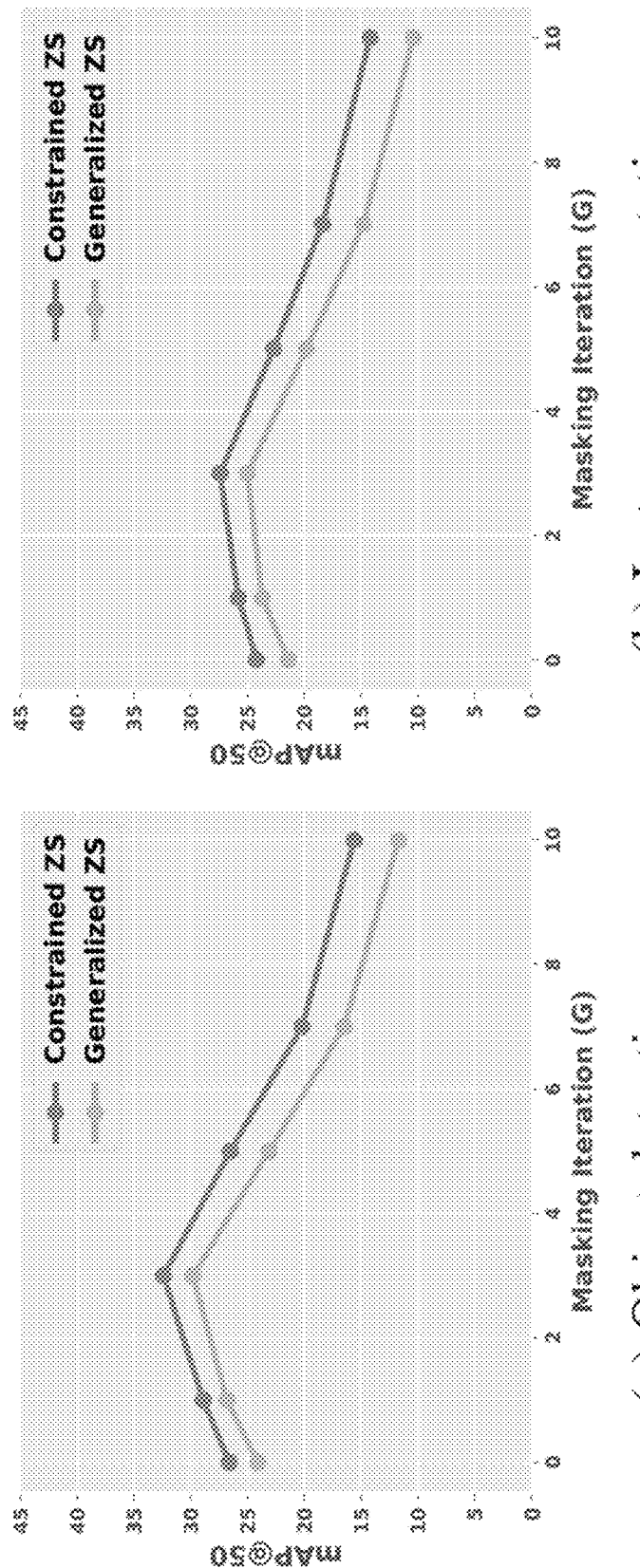

FIG. 12(a) presents a visualization of activation maps generated for the object of interest (woman and dog). The generated activation map covers the entire object and it can be used as a guidance function to choose the best bounding box proposal. Note that the activation are square-shaped because the original activation map is 1/16'th of the image size. Nearest interpolation is performed to obtain an activation map of image size. In FIG. 5 (b), the pseudo-mask is visualized for Open Images generated from our pipeline. It is observed that the generated pseudo-mask is of good quality; still contains some false positives. However, with Mask-RCNN training, the model learns to filter the noise present in the pseudo-mask producing better-quality predictions.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of open vocabulary instance detection in an unannotated image, the method comprising:
   receiving, via a data interface, an image and a text caption accompanying the image;
   generating, by a pretrained vision-language model, an activation map of the image based on the image and the text caption;
   iteratively masking a discriminative part of an object on the activation map for one or more iterations into a masked activation map;
   generating, by a proposal network, one or more bounding box proposals covering a region of the object on the image;
   selecting a pseudo bounding box from the one or more bounding box proposals that overlaps the most with the masked activation map;
   cropping the image into an image patch containing the object according to the pseudo bounding box; and
   generating, by a segmentation module, a pixel-level annotation indicating the object on the image based on the cropped image.

2. The method of claim 1, wherein generating, by the pretrained vision-language model, the activation map of the image comprises:
   encoding, by an image encoder, the image comprising a set of regions into an image representation;
   encoding, by a text encoder, the caption comprising a set of objects of interest into a text representation;
   generating, by a multi-modal encoder, attention scores between the set of regions and the set of objects based on the image representation and the text representation; and
   generating the activation map of the image based on the attention scores.

3. The method of claim 1, wherein iteratively masking the discriminative part of the object on the activation map comprises:
   replacing the discriminative part on the activation map with an image mean at each iteration.

4. The method of claim 1, wherein generating, by the proposal network, one or more bounding box proposals covering the region of the object on the image comprises:
   generating a set of bounding box proposals covering different regions of the image;
   generating, by the proposal network, pooled feature vectors relating to regions of interest on the image based on the image and the set of bounding box proposals;
   generating a detection matrix and a classification matrix based on the pooled feature vectors; and
   generating the one or more bounding box proposals from the set of bounding box proposals based on proposal confidence scores computed from the detection matrix.

5. The method of claim 4, further comprising:
   computing instance-level classification scores and image-level classification scores from the detection matrix and the classification matrix;
   computing a classification loss based on a binary image label and the image-level classification scores, and a regression loss based on the set of bounding box proposals and pseudo regression targets; and
   updating the proposal network based on the classification loss and the regression loss.

6. The method of claim 1, further comprising:
   sampling a set of foreground points and a set of background points from the masked activation map;
   computing a first loss based on the pixel-level annotation and the set of foreground points and a second loss based on the pixel-level annotation and the set of background points; and
   updating the segmentation module based on the first loss and the second loss.

7. The method of claim 6, wherein the set of foreground points are sampled from a most active part of the masked activation map within the pseudo bounding box, and
   the set of background points are sampled from a least active part of the masked activation map within the pseudo bounding box.

8. The method of claim 1, further comprising:
training an instance segmentation model using the pseudo bounding box and/or the pixel-level annotation as ground truth.

9. The method of claim 8, wherein training the instance segmentation model further comprises:
encoding a training image into a set of region embeddings;
encoding a training caption into a set of text embeddings;
computing similarity scores between the set of region embeddings and the set of text embeddings;
computing a loss based on the similarity scores; and
updating the instance segmentation model based on the loss.

10. A system of open vocabulary instance detection in an unannotated image, the system comprising:
a data interface receiving an image and a text caption accompanying the image;
a memory storing a plurality of processor-executable instructions; and
one or more processors executing the plurality of processor-executable instructions to perform operations comprising:
generating, by a pretrained vision-language model, an activation map of the image based on the image and the text caption;
iteratively masking a discriminative part of an object on the activation map for one or more iterations into a masked activation map;
generating, by a proposal network, one or more bounding box proposals covering a region of the object on the image;
selecting a pseudo bounding box from the one or more bounding box proposals that overlaps the most with the masked activation map;
cropping the image into an image patch containing the object according to the pseudo bounding box; and
generating, by a segmentation module, a pixel-level annotation indicating the object on the image based on the cropped image.

11. The system of claim 10, wherein the operation of generating, by the pretrained vision-language model, the activation map of the image comprises:
encoding, by an image encoder, the image comprising a set of regions into an image representation;
encoding, by a text encoder, the caption comprising a set of objects of interest into a text representation;
generating, by a multi-modal encoder, attention scores between the set of regions and the set of objects based on the image representation and the text representation; and
generating the activation map of the image based on the attention scores.

12. The system of claim 10, wherein the operation of iteratively masking the discriminative part of the object on the activation map comprises:
replacing the discriminative part on the activation map with an image mean at each iteration.

13. The system of claim 10, wherein the operation of generating, by the proposal network, one or more bounding box proposals covering the region of the object on the image comprises:
generating a set of bounding box proposals covering different regions of the image;
generating, by the proposal network, pooled feature vectors relating to regions of interest on the image based on the image and the set of bounding box proposals;
generating a detection matrix and a classification matrix based on the pooled feature vectors; and
generating the one or more bounding box proposals from the set of bounding box proposals based on proposal confidence scores computed from the detection matrix.

14. The system of claim 13, wherein the operations further comprise:
computing instance-level classification scores and image-level classification scores from the detection matrix and the classification matrix;
computing a classification loss based on a binary image label and the image-level classification scores, and a regression loss based on the set of bounding box proposals and pseudo regression targets; and
updating the proposal network based on the classification loss and the regression loss.

15. The system of claim 10, wherein the operations further comprise:
sampling a set of foreground points and a set of background points from the masked activation map;
computing a first loss based on the pixel-level annotation and the set of foreground points and a second loss based on the pixel-level annotation and the set of background points; and
updating the segmentation module based on the first loss and the second loss.

16. The system of claim 15, wherein the set of foreground points are sampled from a most active part of the masked activation map within the pseudo bounding box, and the set of background points are sampled from a least active part of the masked activation map within the pseudo bounding box.

17. The system of claim 10, wherein the operations further comprise:
training an instance segmentation model using the pseudo bounding box and/or the pixel-level annotation as ground truth.

18. The system of claim 17, wherein the operation of training the instance segmentation model further comprises:
encoding a training image into a set of region embeddings;
encoding a training caption into a set of text embeddings;
computing similarity scores between the set of region embeddings and the set of text embeddings;
computing a loss based on the similarity scores; and
updating the instance segmentation model based on the loss.

19. A non-transitory processor-readable storage medium storing a plurality of processor-executable instructions for open vocabulary instance detection in an unannotated image, the instructions being executed by one or more processors to perform operations comprising:
receiving, via a data interface, an image and a text caption accompanying the image;
generating, by a pretrained vision-language model, an activation map of the image based on the image and the text caption;
iteratively masking a discriminative part of an object on the activation map for one or more iterations into a masked activation map;
generating, by a proposal network, one or more bounding box proposals covering a region of the object on the image;
selecting a pseudo bounding box from the one or more bounding box proposals that overlaps the most with the masked activation map;
cropping the image into an image patch containing the object according to the pseudo bounding box; and generating, by a segmentation module, a pixel-level annotation indicating the object on the image based on the cropped image.

20. The non-transitory processor-readable storage medium of claim 19, training an instance segmentation model using the pseudo bounding box and/or the pixel-level annotation as ground truth.

\* \* \* \* \*